(12) United States Patent
Wing et al.

(10) Patent No.: US 8,248,942 B2
(45) Date of Patent: Aug. 21, 2012

(54) MONITORING OF REAL-TIME TRANSPORT PROTOCOL (RTP) PACKET FLOW ALONG RTP PATH

(75) Inventors: Daniel G. Wing, Milpitas, CA (US); Ali C. Begen, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 258 days.

(21) Appl. No.: 12/360,247

(22) Filed: Jan. 27, 2009

(65) Prior Publication Data

US 2010/0188989 A1    Jul. 29, 2010

(51) Int. Cl.
*G01R 31/08* (2006.01)
(52) U.S. Cl. .................................................... 370/235
(58) Field of Classification Search ....... 370/235–238.1, 370/241–253, 270, 389, 394, 395.21, 395.4, 370/412–416, 428, 465, 468, 508, 519; 709/223–235; 455/9, 515, 67.11, 115.1
See application file for complete search history.

(56) References Cited

U.S. PATENT DOCUMENTS

| | | | |
|---|---|---|---|
| 7,072,305 B1 * | 7/2006 | Gregson | 370/241 |
| 2005/0243733 A1 * | 11/2005 | Crawford et al. | 370/252 |
| 2006/0268718 A1 * | 11/2006 | Jones | 370/235 |
| 2008/0175162 A1 | 7/2008 | Wing et al. | |
| 2008/0285463 A1 | 11/2008 | Oran | |
| 2009/0193506 A1 | 7/2009 | McGrew et al. | |
| 2009/0234940 A1 * | 9/2009 | Pal et al. | 709/224 |
| 2010/0138885 A1 * | 6/2010 | Haimi-Cohen | 725/109 |

* cited by examiner

*Primary Examiner* — Kwang B Yao
*Assistant Examiner* — Tung Q Tran
(74) *Attorney, Agent, or Firm* — Edell, Shapiro & Finnan, LLC

(57) ABSTRACT

Techniques are provided herein to enable monitoring of a real-time transport protocol (RTP) packet flow in devices along the path that the RTP packet flow traversed from a source to a destination. A device that is a source or destination of a RTP packet flow transmits a monitor request message that requests one or more other devices along a path of the RTP packet flow to monitor the RTP packet flow. The device that is the source or destination of the RTP packet flow receives one or more monitoring reports from the one or more other devices along the path of the RTP packet flow. This allows a device that requested monitoring of the RTP packet flow to analyze the monitor reports in order to determine a location of a cause of reduced performance in the RTP packet flow. e.g., missing packets, overly delayed packets, etc.

29 Claims, 8 Drawing Sheets

FIG. 8

RTP MONITOR REPORT FORMAT
200

| Version | Response-Code | Beginning Sequence Number |
|---|---|---|
| Ending Sequence Number | | Count of Jittered Sequences |
| Count of One-Off Sequences | | Count of Range of Sequences |
| SSRC | | |
| Jittered Sequence | | Unexpected Delay (in ms) |
| One-Off Sequence | | One-Off Sequence |
| Beginning Range | | Ending Range |

FIG. 9

EXAMPLE RTP MONITOR REPORT

| 1 | 1 | 30 |
|---|---|---|
| | 95000 | 3 |
| | 5 | 2 |
| | 1839489 ||
| | 50 | -12 |
| | 52 | 5 |
| | 55 | 4 |
| | 3759 | 3813 |
| | 3891 | 4010 |
| | 8389 | Ignored (padded) |
| | 100 | 104 |
| | 406 | 408 |

MONITORING OF REAL-TIME TRANSPORT PROTOCOL (RTP) PACKET FLOW ALONG RTP PATH

TECHNICAL FIELD

The present disclosure relates to content distribution networks and techniques for monitoring performance of packet streams distributed from a source to a destination.

BACKGROUND

Distribution of real-time video and/or audio is sensitive to latency. As a result, lost packets in a stream are sometimes not retransmitted because the decoder at the destination device cannot use them to correct for the lost packet when the retransmitted packet eventually arrives. As a result, the quality of a video stream can become degraded when packets are lost at an unacceptable rate.

A network that delivers real-time audio or video content is referred to herein as a content delivery network (CDN). Applications, such as real-time video and/or audio, which use the real-time transport protocol (RTP) packet transport technique can determine when packet loss (or excessive delay) occurs as a device plays out the RTP content. Information about such loss can be reported. However, it is still difficult to determine where, in a network, the cause of the packet loss (or excessive delay) is occurring. If the location of the problem can be determined, then the device (hardware or software) that is causing the problem can be repaired or replaced and the service can be returned to better performance.

BRIEF DESCRIPTION OF THE DRAWINGS

FIG. 8 is a diagram that illustrates an example of a format for a monitor report.

FIG. 9 is a diagram that illustrates an example of a monitor report containing data for an example of measurements made by a device on a packet flow.

DESCRIPTION OF EXAMPLE EMBODIMENTS

Overview

Techniques are provided herein to enable monitoring of a real-time transport protocol (RTP) packet flow in devices along the path that the RTP packet flow traverses from a source to a destination. A device that is a source or destination of a RTP packet flow transmits a monitor request message that requests one or more other devices along a path of the RTP packet flow to monitor the RTP packet flow. The device that is the source or destination of the RTP packet flow receives one or more monitoring reports from the one or more other devices along the path of the RTP packet flow. This allows a device that requested monitoring of the RTP packet flow to analyze the monitor reports in order to determine a location of a cause of reduced performance in the RTP packet flow. e.g., missing packets, overly delayed packets, etc.

Figure 1:
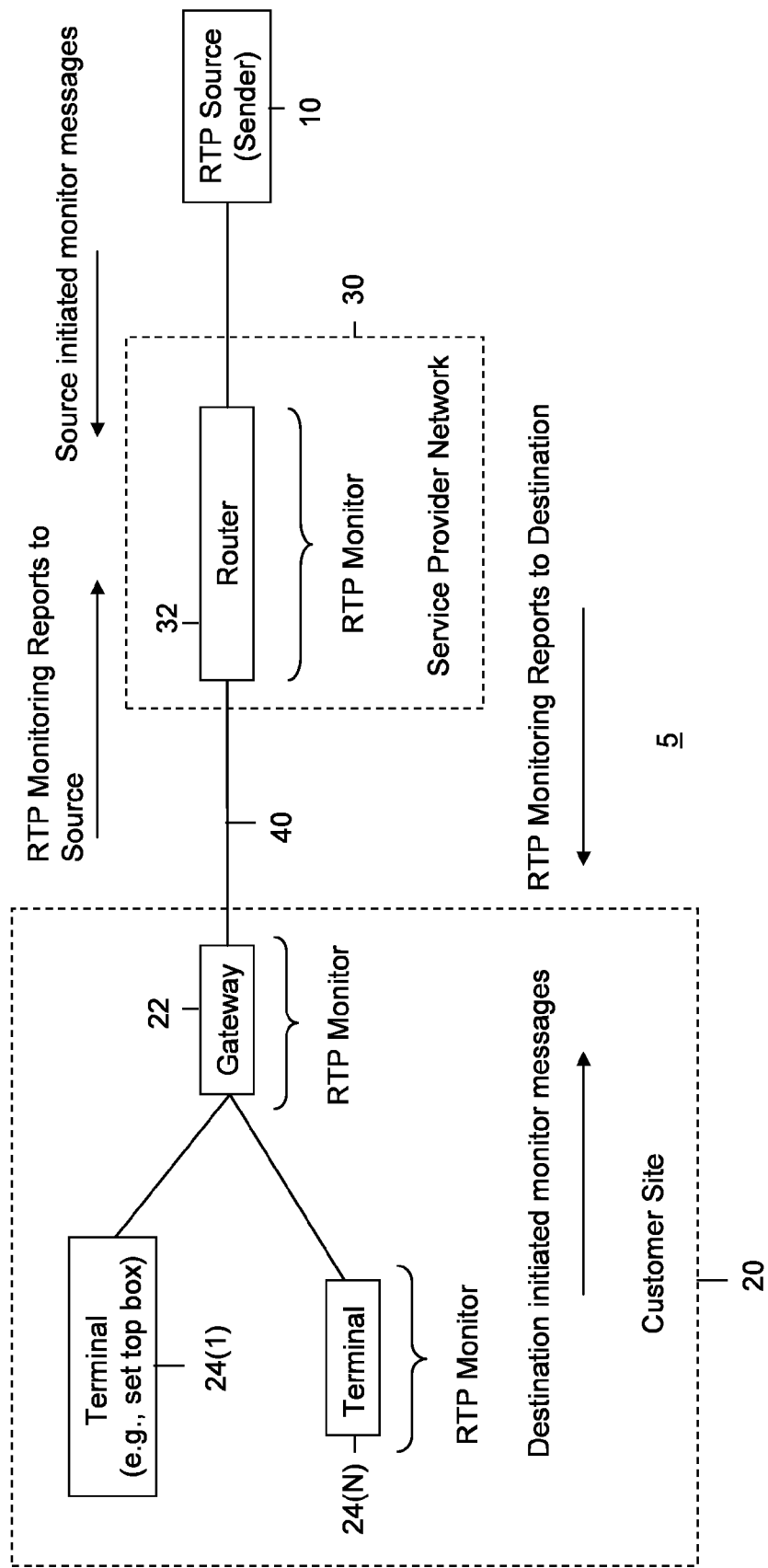
FIG. 1 is a block diagram of a data distribution system in which various devices in the path of a packet flow are configured to monitor and report on statistics associated with a packet flow.

Referring first to FIG. 1, a content delivery network (CDN) 5 is shown comprising an RTP source device 10 that sends one or more streams or flows of RTP packets. The RTP source device 10 may be managed by a service provider that distributes audio and/or video content (or any other types of real-time content) to one or multiple customer sites, one of which is shown at reference numeral 20. The RTP source device 10 is also known as a streaming server that streams content to receivers or destinations at customer sites. While FIG. 1 shows a single customer site 20, it should be understood that there are typically numerous customer sites in the distribution system 5. One example of an application of the techniques described herein is an Internet-Protocol television (IPTV) distribution system. However, these techniques may be useful in any system that distributes streams of data using RTP transport.

The RTP source device 10 transmits the RTP packet flows via a service provider network 30. The service provider network 30 may be wired and/or wireless and may employ optical communications techniques as well. Within the service provider network 30, there is at least one router device 32 that is managed by the service provider. The router device 32 controls the destinations of RTP packet flows from the RTP source device 10 through the network 30.

The customer site 20 may take on a variety of configurations. FIG. 1 shows an example of a basic configuration in which a gateway device 22 interfaces to receive and transmit data between the customer site and the service provider network 30. There is an access link 40 that connects the customer site 20 to the service provider network 30. One example of an access link 40 is a digital subscriber line (DSL), which may be part of an access network. However, there are other types of access links, such as a wireless local loop.

The gateway device 22 is a network interface apparatus also known in the art as a network address translation (NAT) gateway device. The gateway device 22 in turn communicates, by wired or wireless link, to one or more terminal devices 24(1)-24(N). For example, one terminal device 24(1) may be a set-top box (STB) device and another terminal device, e.g., terminal device 24(N) may be a personal computer (laptop or desktop). Thus, there is a separate network at the customer site 20 that is comprised of the gateway device 22 and the one or more terminals 24(1)-24(N). The network at the customer site 20 may be wired and/or wireless, or a combination of both.

Techniques are provided to allow one or more devices in the path of an RTP flow to monitor the RTP flow as it traverses the device. The devices that monitor the RTP flow may be intermediate devices, such as the router device 32 or gateway device 22, or destination devices such as the terminals 24(1)-24(N). The request to monitor an RTP flow may originate at any the sender of an RTP flow, e.g., at the RTP source device 10 or at any of the destination or receivers of the RTP flow, e.g., at any of the terminal devices 24(1)-24(N) or for that matter the gateway device 22. For example, the RTP source device 10 can send a message to request that downstream router and other devices monitor a particular RTP flow. The RTP source device 10 can query those router and other devices for information about RTP packet loss or jitter in the RTP packet flow observed at those devices. In another example, a destination device (e.g., a terminal device 24(1)-24(N) and the gateway device 22) can request that upstream router devices monitor the RTP flow. The RTP destination devices can then query those router devices for packet loss and jitter information.

As indicated in FIG. 1, there are numerous devices along the path of an RTP flow that may perform RTP flow monitoring, and in so doing, provide data about an RTP flow at different points in the distribution network. While RTP has a packet loss/jitter reporting mechanism, this mechanism does not provide any information as to where in the network a problem is occurring. By remotely requesting devices along a path of an RTP flow to monitor one or more RTP flows, it is possible to gather information about the RTP flow to isolate where in the distribution network there is a fault or problem that is causing degraded performance at a destination device. For example, if at the customer site 20, one terminal device reports packet loss issues and all other terminal devices and the gateway device 22 do not report packet loss issues, then the cause of the packet loss issues likely resides in that one terminal device or in the link between the gateway device 22 and that terminal device. Further still, if the gateway device 22 and terminal devices 24(1)-24(N) are all experiencing serious packet loss issues, then the cause of the problem may be said to reside in the access link 40.

Figure 2:
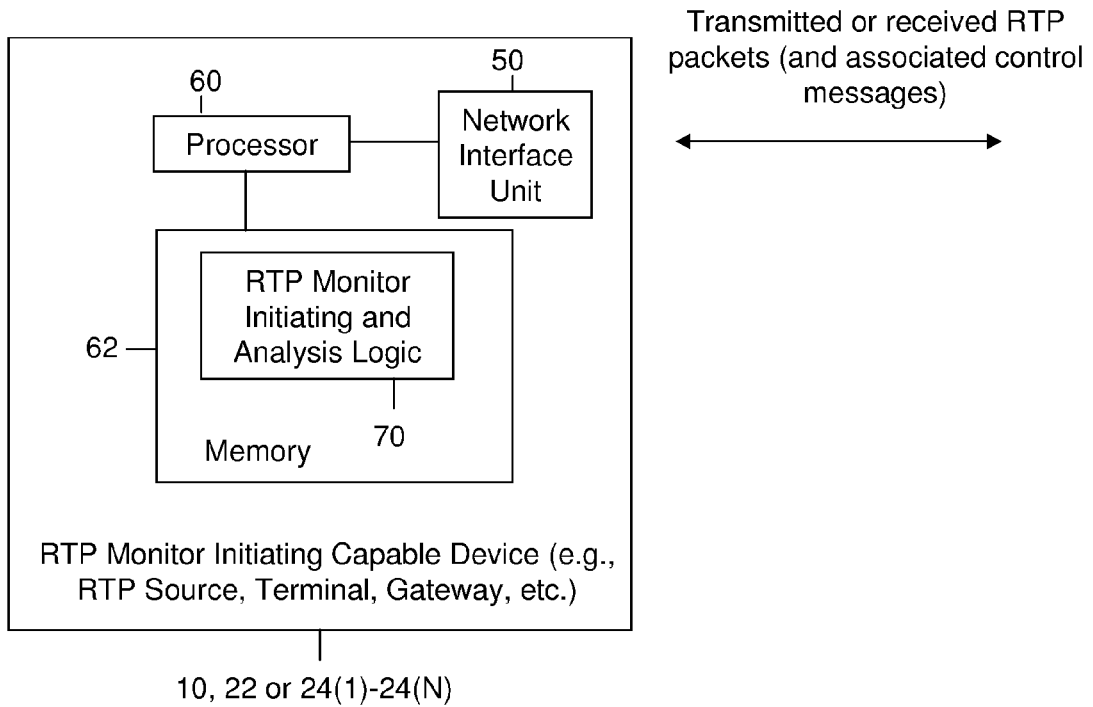
FIG. 2 is a block diagram of a device that is configured with logic to initiate monitoring of a packet flow by other devices in the path of the packet flow and to analyze monitoring reports.

FIG. 2 shows an example of a block diagram of a device that is configured to initiate RTP monitoring of an RTP flow and analyze the results of such RTP monitoring. As indicated above, such a device may be the RTP source device 10, the gateway device 22 and any one of the terminal devices 24(1)-24(N). Within any of these devices, there is a network interface unit 50 or other similar component that transmits and receives packets, such as packets that are part of an RTP packet flow, across a network. A data processor (microprocessor, microcontroller, digital signal processor, etc.) 60 is configured to connect to the network interface unit 50 to perform higher level functions with respect to content contained in a RTP packet flow. A memory or other storage device 62 is provided that the processor 60 uses for computations. The memory 62 also stores RTP monitor initiating and analysis logic 70 that the processor 60 executes in order to initiate an RTP monitor session and to analyze results of RTP monitoring. The logic 70 may be embodied by (computer) processor readable instructions stored or encoded in the memory 62. A flow chart that depicts an example of the RTP monitor initiating and analysis logic 70 is described hereinafter in connection with FIG. 4. It should be understood that the block diagram shown in FIG. 2 is only an example and there are other components that are part of these devices which are not shown for simplicity.

Figure 3:
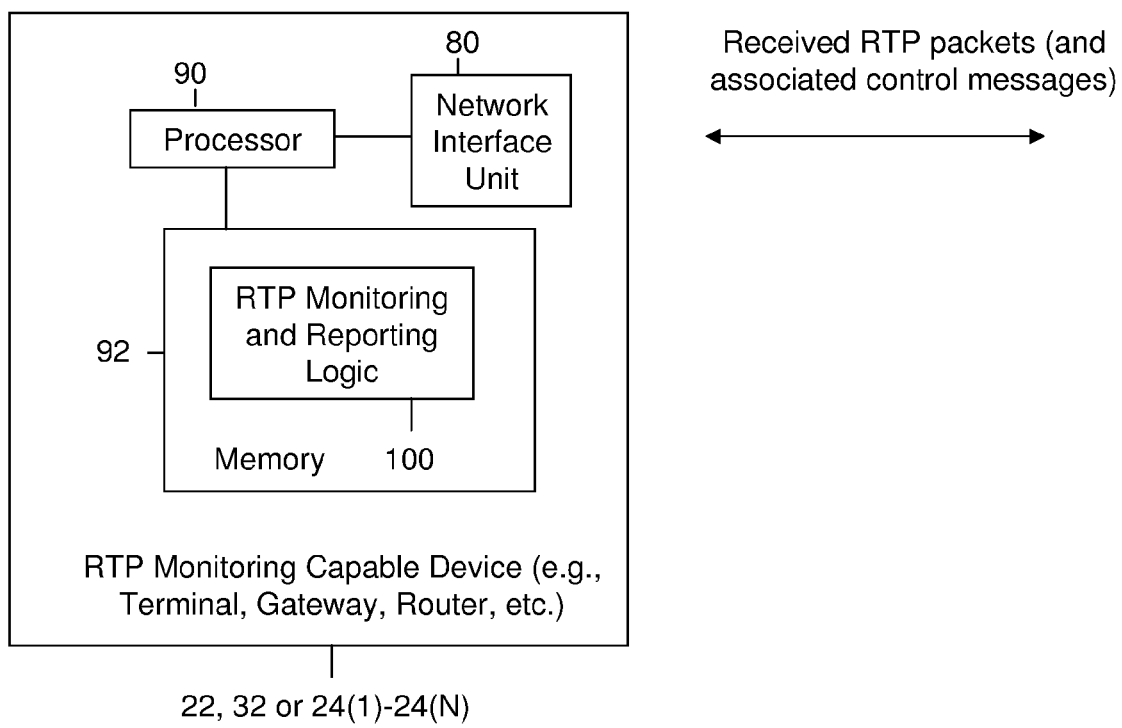
FIG. 3 is a block diagram of a device that is configured with logic to perform monitoring of a packet flow in response to a monitoring request message from another device and to send monitor reports.

Similarly, FIG. 3 shows an example of a block diagram of a device that is configured to perform RTP monitoring on an RTP flow and to generate RTP monitor reports. Examples of devices that may be configured to perform RTP monitoring are the router device 32, the gateway device 22 and the terminal devices 24(1)-24(N). To this end, such a device comprises a network interface unit 80, a processor 90 and memory 92 similar to that shown in FIG. 2. The network interface unit 80 is configured to at least receive packets, such as packets that are part of an RTP packet flow, from a network. In some devices (e.g., the router device 32 or gateway device 22), the network interface unit 80 also transmits packets that are part of an RTP packet flow. The memory 92 stores RTP monitoring and reporting logic 100 that the processor executes to order to perform RTP monitoring and report generation. The logic 100 may be embodied by (computer) processor readable instructions stored or encoded in the memory 92. A flow chart that depicts an example of the logic 100 is described hereinafter in conjunction with FIG. 7.

It should be understood that the same device may be configured to perform both the logic 70 and the logic 100, that is, to both request monitoring at other devices, receive and analyze reports from other devices, as well as to perform monitoring in order to generate and send reports to another device that has requested RTP monitoring. Again, an example of a device that may be capable of operating in both of these modes is a terminal device 24(1)-24(N) and the gateway device 22.

Figure 4:
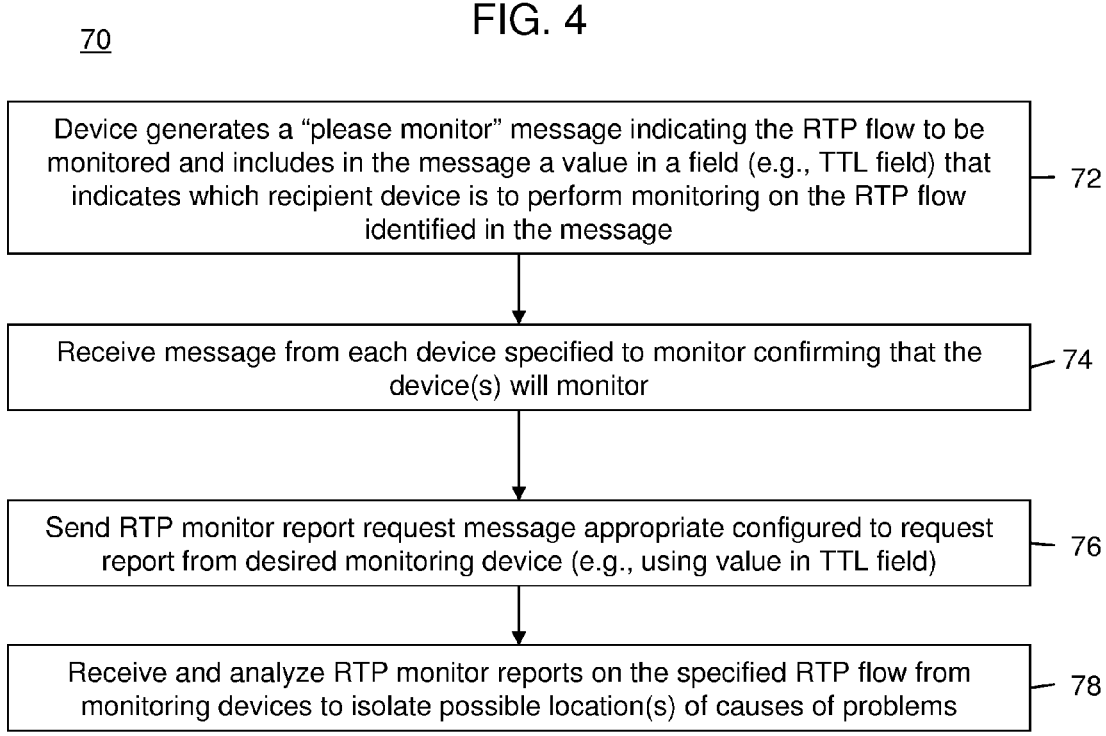
FIG. 4 is an example of a flow chart for the logic that initiates monitoring of a packet flow by other devices and analyzes monitoring reports.

Referring now to FIG. 4, a flow chart is described for an example of the RTP monitor initiating and analysis logic 70. Generally, the logic 70, when executed by a processor, causes the processor in a device that is a source or destination of an RTP packet flow to transmit a monitor request message that requests one or more other devices along a path of the RTP packet flow to monitor the RTP packet flow, and to receive at the device that is the source or destination of the RTP packet flow one or more monitoring reports from the one or more other devices along the path of the RTP packet flow. The process 70 shown in FIG. 4 is generally not invoked until and unless there is a problem reported at a device along the path of an RTP flow, e.g., a terminal device is reporting severe performance degradation, e.g., severe packet loss.

At 72, the device generates a monitor request message, also called a "please monitor" message that identifies the RTP flow to be monitored and includes in the monitor request message a flag or other indicator that identifies the recipient devices along the path of the RTP flow to perform monitoring of the RTP flow identified in the monitor request message. The "please monitor" message is generally not sent out until the sender of the message has learned that an identifier of the RTP stream/flow, e.g., the synchronization source (SSRC) identifier. The "please monitor" message contains a MONITOR-RTP-FLOW attribute that sets some basic parameters for monitoring of the RTP flow. An example of the MONITOR-RTP-FLOW attribute is described hereinafter in conjunction with FIG. 5.

It may be desirable to control which devices along a path of an RTP flow are to monitor a particular RTP flow. One technique to achieve this is to send a message with a value in the IP time-to-live (TTL) field that expires at the device that is to perform the RTP monitoring. The TTL field or flag is set to a different value according to which device along the path of the RTP packet flow is to perform monitoring of the RTP packet flow. Using the TTL field allows a device to only examine the rest of the message if the TTL is zero, which eases the computational burden. The sender of the "please monitor" message will set the value of the TTL field according to control which device in the RTP path should be responsive to the "please monitor" message. Thus, a different "please monitor" message is sent for each intended or target device to perform monitoring of a specified RTP flow. The device that is requesting monitoring sends separate "please monitor" messages with different TTL values to initiate monitoring at devices at different locations and uses the same TTL values later in report request messages to ask for monitoring reports from those devices.

If the device that generates this message is the RTP source device 10, then the "please monitor" messages are sent along the exact path as the RTP stream to be monitored, which may cause the routers in that path to begin monitoring the RTP stream. The RTP source device 10 may query for and collect RTP monitor reports at any time thereafter. For example, immediately after receiving a message from a terminal or other device that indicates "serious" packet loss, the RTP source device 10 may decide to check the devices that have been commanded to serve as RTP monitors in order to see if those devices observed lost/delayed packets.

According to one technique, the RTP source device 10 sends "please monitor" messages with increasing values in the IP TTL field until the message hits the TTL of the desired device to monitor, e.g., the router device 32, and the RTP source device 10 receives a confirmation message from that device indicating that it will begin RTP monitoring. A device checks the message content when the TTL expires (e.g., TTL=0). Every router that forwards an IP packet decrements the value in the TTL field by one. When it is desired to send a message intended for action at a device at the next immediate hop, the TTL field is set to 1. When a message is sent with the TTL field set to 2, not the next hop but the hop following the next one will read the message. In the example shown in FIG. 1, if a "please monitor" message is sent by the terminal 24(1) with the TTL field set to 2, then the message is intended for the router device 32. The gateway device 22, when the "please monitor" message with TTL=2 traverses it, will decrement the TTL field to 1 and the gateway device 22 will thus not evaluate the message. When this message arrives at the router device 32, the TTL field is at 1 (due to its passing through the gateway device 22) and when decremented again by the router device 32, the TTL field will be zero and the router device 32 knows it needs to evaluate the message.

If the device sending the "please monitor" message is receiving an RTP stream and wants to initiate monitoring, one technique to is to send a packet encoded using Session Traversal Utilities for NAT (STUN) to the IP address of the RTP source device 10, with a value in the TTL field of the packet set to a value according to the number of hops the intended recipient device is from the requesting device. As part of their Internet Control Message Protocol (ICMP) processing, the gateway device 22 and the router device 32 recognize that the STUN packet contains MONITOR-RTP-FLOW attributes. The gateway device 22 and router device 32 generate an ICMP "TTL Exceeded" message that includes an indication that the device will monitor the particular RTP flow. For the configuration shown in FIG. 1, the terminal device sends a "please monitor" message with a TTL=1 when the gateway device 22 is a device that the terminal device is requesting to monitor an RTP flow and sends a "please monitor" message with TTL=2 when the router device 32 is a device that the terminal device is requesting to monitor an RTP flow. When a device that is downstream of the gateway device 22, e.g., one of the terminals 24(1)-24(N), wants to initiate monitoring in the gateway device 22 or upstream routers, the STUN messages are particularly useful because the response messages easily traverse the gateway device 22. Moreover, a device receiving a STUN message needs to examine the message only if the packet arrived with IP TTL=1.

In general, a device that is to initiate monitoring at another device (upstream or downstream from it) transmits a "please monitor" message with the TTL field set to a value that determines at which device along the path of the RTP packet flow that monitoring is to be performed based on a number of device hops from the device that sends the monitor request message.

Figure 5:
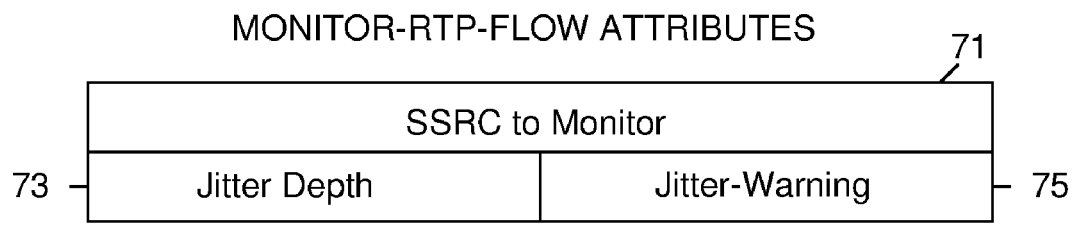
FIG. 5 is a diagram that shows an example of specifying attributes for a packet flow to be monitored in a monitor request message.

FIG. 5 illustrates an example of a MONITOR-RTP-FLOW attribute that is contained in a "please monitor" message. There is an SSRC identifier field 71 that contains a string of bits that identifies the RTP flow to be monitored. There is a jitter depth field 73 that indicates a minimal jitter, in milliseconds (for example) of delayed or out-of-order packets which are to be considered lost packets. There is also a jitter warning field 75 that is a threshold (overly-jitter threshold) above which any packet jitter is to be reported.

Referring back to FIG. 4, after the "please monitor" messages are sent, then at 74, the device that sent those messages receives a message from each device specified to monitor a RTP flow confirming that those devices will in fact perform monitoring. At some point in time thereafter, the device that initiated the RTP monitoring may, at 76, send RTP monitor report request messages to the devices called upon for RTP monitoring. Like the "please monitor" messages that use values in the TTL field to determine at which device the messages are processed, each RTP monitor report request messages is configured with an appropriate value in the TTL field so it is acted on by the desired monitoring device. That is, the device that is requesting the RTP monitor report sends a report request message with the TTL field in the report request message set to a value that determines at which device along the path of the RTP packet flow the monitor report is generated based on a number of device hops from the device that sends the report request message.

At 78, the RTP monitor reports are received and analyzed in order to isolate possible locations of problems in the distribution system. Again, these RTP monitor reports may be received and analyzed by the RTP source device 10 or by a terminal device 24(1)-24(N), or even the gateway device 22, depending on which device sent the "please monitor" message. Alternatively, the reports may also be sent to a third device for further analysis.

Figure 6:
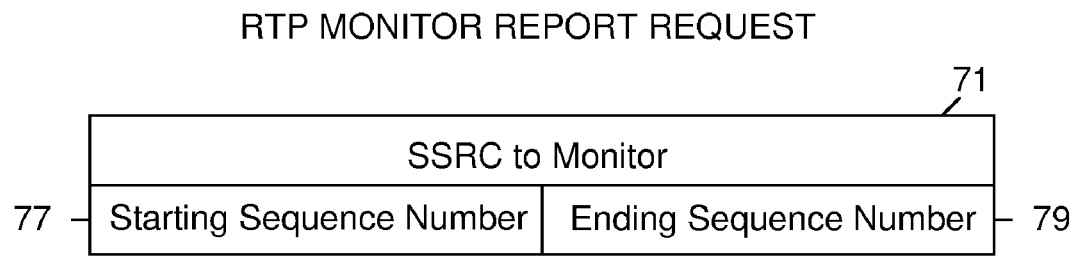
FIG. 6 is a diagram that illustrates an example of a message to request a monitor report from a device that is monitoring a packet flow.

FIG. 6 illustrates an example of an RTP monitor report request message or packet. There is an SSRC identifier field 71 that contains a string of bits that identifies the RTP flow to be reported on. There is a starting sequence number field 77 and an ending sequence number field 79, which together identify to the RTP monitoring device a range of RTP packets bounded by a starting sequence value and an ending sequence value to be reported on in terms of lost packets, packet jitter, etc.

Figure 7:
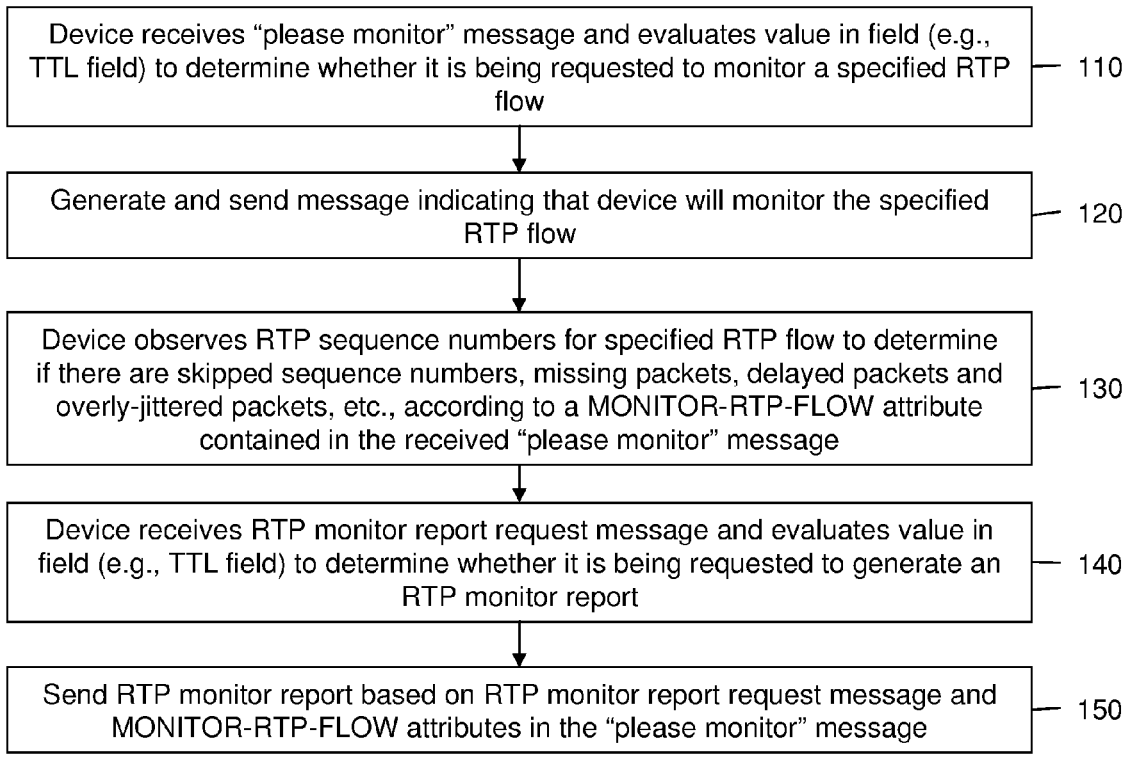
FIG. 7 is a flow chart for the logic that monitors a packet flow and sends monitor reports.

The RTP monitoring and reporting logic 100 is now described with respect to the flow chart shown in FIG. 7. This logic is executed within a device that is configured to monitor and report on RTP flows. At 110, the device receives a "please monitor" message and sees a value in the TTL field or other indication in the message that indicates that the device is being requested to monitor a specified RTP flow. When the TTL field triggering mechanism referred to above is used, the device's normal operation decrements by one any IP packet, including the received monitor request message. It then evaluates the resulting value (after decrementing) to determine if it is zero and thus configuring itself to initiate monitoring of the RTP packet value. At 120, the device generates and sends a message back indicating that it will monitor the specified RTP flow. At 130, the device begins monitoring the RTP flow to observe RTP sequence numbers in order to determine if there are skipped packet sequence numbers, missing packets, delayed packets and overly-jittered packets, etc., according to the MONITOR-RTP-FLOW attributes contained in the received "please monitor" message. For example, a device that is performing RTP monitoring may observe RTP sequence numbers for each RTP flow to be monitored (up to a reasonable maximum, such as 3). When packet sequence numbers for observed packets are skipped or missing, the device will store information identifying which packets (by sequence numbers) were skipped, missing or lost. The device may store a reasonable number (e.g., 20) of lost sequence numbers for each RTP flow. The device may also store an indication of a lowest sequence number it has observed and the highest sequence number it has observed, and a reasonable number of missing packet sequence numbers between.

Another technique may involve having a circular buffer dedicated in the device for each RTP flow to be monitored. The buffer is a fixed-length buffer established when RTP monitoring is requested for that RTP flow and contains, for example, several hundred entries. Each entry contains information about each received RTP packet: the RTP sequence number and RTP timestamp and the device's internal timestamp. When the device receives an RTP packet that is being monitored, it places that packet's sequence number and RTP timestamp and the internal timestamp into the circular buffer, with no regard for other entries in the circular buffer and no processing whatsoever, that is, without analysis of data in the circular buffer. At 140, a RTP monitor report request message is received. When the TTL field triggering mechanism referred to above is employed, a device receiving a report request message decrements the value in the TTL field of the received report request message, evaluates the resulting value (after decrementing, i.e., is it zero) to determine whether to generate and transmit a monitor report in response to the report request message. Only when an RTP report is requested is the data in the circular buffer analyzed to find missing, delayed, or overly-jittered packets. This algorithm uses memory to offset processing time during receipt of a packet. At 150, the device sends an RTP monitor report based on the RTP monitor report request message and the MONITOR-RTP-FLOW attributes contained in the "please monitor" message.

Turning now to FIG. 8, an example of a format for an RTP monitor report shown generally at reference numeral 200 is described. There is a version ("Ver") field 210 that is useful to describe a version of the reporting algorithm, assuming that there may be different reporting formats. There is a response-code field 220, a beginning sequence number field 222, an ending sequence number field 224, a count of jittered sequences field 230, a count of one-off sequences field 240 and a count of range of sequences field 250.

The response-code field contains a variety of values to indicate several pieces of information. For example, a zero ("0") value in this field indicates that this is an RTP monitor report. A one ("1") value in this field confirms and indicates that the device will start monitoring a specified SSRC. A two ("2") value in this field indicates that there are no overly-jittered or lost packets in the range of sequence numbers specified in fields 222 and 224, respectively. A three ("3") value in this field indicates that the device was not monitoring this SSRC (due to a routing path change or a device reload), and is sent in response to an RTP Report request. A four ("4") value in this field indicates that the device was unable to start monitoring this SSRC, because it was not receiving the specified packet sequence numbers; this response-code value is sent in response to an RTP Monitor ("please monitor") request message. This first section of the report format 200 contains higher level or summary type information. Further parameters may be included used in the monitor reports.

The count of jittered sequences field 230 indicates a count of the number of packets that have exceeded the packet delay variation (overly-jittered threshold) referred to above. The count of one-off sequences field 240 indicates a count of the number of single (e.g., "one-off") packets that have been observed lost or missing. The count of range of sequences field 250 indicates a number of ranges of packets that have been observed lost or missing.

There is also another section of the report format 200 that begins with an SSRC field 260 that contains an identifier of an RTP flow, and is followed by one or more instances of a jittered sequence field 262 and an associated unexpected delay field 264, one-off sequence fields 266, a beginning range field 268 and an ending range field 269. The SSRC field 260 contains the identifier of an RTP flow for which the subsequent fields of the report are reporting on. The jittered sequence field 262 identifies a sequence number of a packet that experienced jitter (above the specified jitter threshold) and this field is paired with the unexpected delay field 264 that indicates the measured (unexpected) delay for that packet identified in field 262. There may be multiple pairs of fields 262 and 264 in a given report. The one-off sequence fields 266 indicate lost "one-off" packets (by sequence number), that is, missing packets that do not fall within a range of packets where there are other missing packets. There may be many instances of fields 266 in a report. The beginning range/ending range fields 268 and 269 indicate the beginning packet sequence number and ending packet sequence number for a range of missing packets, and again there may be multiple instances of fields 268(1) and 269(1).

Turning to FIG. 9, an example of a RTP monitor report is now described. In this example, a device observed that an RTP flow identified by SSRC "1839489" had the following unexpected delays (jitter) of some sequences:

50, 12 ms early;
52, 5 ms late;
55, 4 ms late;
the following missed ranges of sequence numbers of packets:
100, 101, 102, 103, 104;
and 406, 407, 408;
and also the following one-off sequence numbers of missing packets:
3759, 3813, 3891, 4010 and 8389.

The RTP monitor report 300 shown in FIG. 9 for the data observed above comprises version field 310 containing a "1" that indicates the report follows report version 1, a response code field 320 containing a "1" that indicates that the report is for a specified SSRC and beginning sequence number and ending sequence number fields 322 and 324 that contain the values "30" and "95000", respectively, to indicate that the report is for a segment of the stream of packets beginning at packet sequence number "30" and ending at packet sequence number "95000". Field 330 contains a value of "3" because there overly jittered packet sequences are reported (the details of which appear in fields 362(1)/364(1)-362(3)-364(3)). Field 340 contains the value "5" to indicate a count of one-off missing packets (corresponding to packets with sequence numbers "3759", "3813", "3891", "4010" and "8389") and field 350 contains the value "2" to indicate the count of a range of sequences with missing packets (i.e., the packet sequence range 100-104 and 406-408). The SSRC field 360 contains the value "1839489" identifying the RTP stream to which the report pertains.

Next, there are three pairs of fields 362(1)-364(1), 362(2)-364(2), 362(3)-364(3) for a sequence number of a packet observed to have more than a predetermined degree of jitter (delay variation) and the corresponding observed delay for that packet. Fields 362(1) and 364(1) indicate that packet with sequence number "50" was observed to be 12 ms early, fields 362(2) and 364(2) indicate that packet with sequence number "52" was observed to be 5 ms late and fields 362(3) and 364(3) indicate that packet with sequence number "55" was observed to be 4 ms late.

Fields 366(1)-366(5) contain values for the packet sequence numbers of the one-off missing packets (packets with sequence numbers 3759, 3813, 3891, 4010 and 8389).

The field pair 368(1)-369(1) contains values for the packet sequence number for a first range of missing packets (packet sequence 100-104) and thus the value "100" is in field 368(1) and the value "104" is in the field 369(1). Similarly, field pair 368(2)-369(2) contains values for the packet sequence number for a second range of missing packets (packet sequence 406-408), and thus the value "406" is in field 368(2) and the value "408" is in the field 369(2).

Data compression techniques may be employed to compress the data in the monitor reports, thereby reducing the size of the monitor reports.

The techniques described herein allow an RTP receiver device, such as a STB, to request its gateway device and upstream routers to monitor incoming RTP flows and send reports to the STB. When the STB observes a packet loss (or excessive jitter), the STB can send a query upstream to the gateway device or routers to learn which of them, if any, also observed a loss. Thus, the STB can isolate the element in the distribution network that is possibly causing the packet loss problems that it is experiencing. As explained above, the RTP source (sender) device can also invoke RTP monitoring at downstream devices to isolate the cause of a problem in the network.

These techniques are particularly useful in CDNs involving two different networks managed by two different entities, i.e., a service provider's network and a customer site network (e.g., a home network) where the ultimately destination devices reside. However, these techniques are also useful in any layer-3 device to help monitor some (or all) RTP flows traversing the device. This can be especially helpful for "high-value" RTP flows, such as those that are to/from devices involved in a videoconferencing session, or for RTP flows for which destination devices have reported difficulties, so that those devices can participate in self-diagnosis, or can obtain information from the RTP monitoring in routers and report that information to a management device. Other devices in which the RTP monitoring techniques would be useful include voice-over-IP (VoIP) equipments.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
    from a device that is a source or destination of a real-time transport protocol (RTP) packet flow, transmitting a monitor request message to one or more other devices along a path of the RTP packet flow that requests the one or more devices to monitor the RTP packet flow and to gather information about the RTP packet flow associated with a plurality of network locations along the path of the RTP packet flow, wherein the monitor request message comprises an identifier that indicates the RTP packet flow to be monitored and an indicator that identifies recipient devices along the path of the RTP packet flow to perform monitoring of the RTP packet flow;
    receiving at the device that is the source or destination of the RTP packet flow one or more monitoring reports generated by and sent from the one or more other devices that receive the monitor request message along the path of the RTP packet flow; and
    determining from the gathered information a particular one of the network locations along the path of the RTP packet flow that corresponds to a network fault causing degraded performance of the RTP packet flow.

2. The method of claim 1, and further comprising transmitting a report request message that requests a monitor report to be generated on the RTP packet flow by the one or more other devices.

3. The method of claim 2, wherein transmitting the report request message comprises including a value in a time-to-live (TTL) field in the report request message, wherein the value in the TTL field is set to a value that determines at which device along the path of the RTP packet flow the monitor report is generated based on a number of hops from the device that sends the report request message.

4. The method of claim 1, wherein transmitting the monitor request message comprises transmitting one or more attributes associated with a packet delay variation threshold on which to report a jitter warning and a jitter depth amount above which to report that a packet is lost.

5. The method of claim 1, and further comprising transmitting the RTP packet flow via a router device in a network from the source to the destination that is located at a site comprising a gateway device that interfaces to one or more terminal devices at the site.

6. The method of claim 5, wherein receiving comprises receiving monitor reports from the router device, the gateway device and the at least one terminal device and further comprising analyzing the monitor reports in order to determine a location of a cause of reduced performance in the RTP packet flow.

7. The method of claim 6, wherein said analyzing is performed at the source.

8. The method of claim 6, wherein said analyzing is performed at the destination.

9. The method of claim 1, and further comprising:
    at the one or more other devices along the path of the RTP packet flow, receiving the monitor request message; and
    monitoring at least one parameter associated with the RTP packet flow in response to the monitor request message.

10. The method of claim 9, and further comprising generating a monitor report based on said monitoring and transmitting the monitor report to a device that transmitted the monitor request message.

11. The method of claim 10, wherein monitoring is based on at least one attribute identified in the monitor request message, and comprises monitoring RTP packet sequence numbers in the RTP flow to determine one or more of: missing RTP packets, packets having a delay variation greater than a threshold, and packet sequence numbers for one or more ranges of missing RTP packets.

12. The method of claim 10, wherein monitoring comprises storing one or more received RTP packets in a circular buffer without analysis of the packets, and further comprising analyzing data in the circular buffer in response to a received monitor report request message.

13. The method of claim 1, wherein transmitting the monitor request message comprises including a value in a time-to-live (TTL) field in the monitor request message, wherein the value in the TTL field is set to a value that determines at which device along the path of the RTP packet flow monitoring of the RTP packet flow is performed based on a number of hops from the device that sends the monitor request message.

14. A method comprising:
    at a device that is in a path of a real-time transport protocol (RTP) packet flow, receiving a monitor request message that requests monitoring of the RTP packet flow, wherein the monitor request message comprises an identifier that indicates the RTP packet flow to be monitored and an indicator that identifies recipient devices along the path of the RTP packet flow to perform monitoring of the RTP packet flow;

gathering information about the RTP packet flow, wherein gathering comprises monitoring at least one parameter associated with the RTP packet flow in response to the monitor request message; and sending a response to the monitor request message, wherein the response to the monitor request message contains the gathered information for use by a source device of the monitor request message to determine a particular one of the network locations along the path of the RTP packet flow that corresponds to a network fault causing degraded performance of the RTP packet flow.

15. The method of claim 14, wherein at the device further comprising decrementing a value in a time-to-live (TTL) field in the received monitor request message and evaluating a resulting value after said decrementing to determine whether to initiate monitoring of the RTP packet flow at the device.

16. The method of claim 14, and further comprising receiving a report request message, decrementing a value in a time-to-live (TTL) field in the received report request message and evaluating a resulting value after said decrementing to determine whether to generate and transmit a monitor report based on said monitoring.

17. The method of claim 16, wherein monitoring is based on at least one attribute identified in the monitor request message, and comprises monitoring RTP packet sequence numbers in the RTP flow to determine one or more of: missing RTP packets, packets having a delay variation greater than a threshold, and packet sequence numbers for one or more ranges of missing RTP packets.

18. The method of claim 14, and further comprising receiving the RTP packet flow that is transmitted from a source into a network via a router device and to a destination that is located at a site comprising a gateway device that interfaces to one or more terminal devices at the site.

19. The method of claim 14, wherein said receiving and monitoring are performed in each of a router device, gateway device and at least one terminal device.

20. The method of claim 19, and further comprising transmitting monitoring reports from the router device, gateway device and at least one terminal device to the source, and further comprising analyzing the monitor reports in order to determine a location of a cause of reduced performance in the RTP packet flow.

21. An apparatus comprising:
a network interface unit that is configured to transmit and/or receive one or more real-time transport protocol (RTP) packet flows;
a processor configured to be connected to the network interface unit, wherein the processor is configured to:
transmit a monitor request message to one or more other devices along a path of the RTP packet flow that requests the one or more devices to monitor the RTP packet flow and to gather information about the RTP packet flow associated with a plurality of network locations of the RTP packet flow, wherein the monitor request message comprises an identifier that indicates the RTP packet flow to be monitored and an indicator that identifies recipient devices along the path of the RTP packet flow to perform monitoring of the RTP packet flow;
receive a monitor report generated by and sent from the one or more other devices that receive the monitor request message along the path of the RTP packet flow; and
determine from the gathered information a particular one of the network locations of the RTP packet flow that corresponds to a network fault causing degraded performance of the RTP packet flow.

22. The apparatus of claim 21, wherein the network interface is configured to transmit the RTP packet flow via a router device in a network to a destination that is located at a site comprising a gateway device that interfaces to one or more terminal devices at the site.

23. The apparatus of claim 22, wherein the processor is further configured to receive monitor reports from the router device, the gateway device and the at least one terminal device and to analyze the monitor reports in order to determine a location of a cause of reduced performance in the RTP packet flow.

24. The apparatus of claim 21, wherein the processor is further configured to generate the monitor request message to include a time-to-live (TTL) field that is set to a value that determines at which device along the path of the RTP packet flow monitoring of the RTP packet flow is performed based on a number of hops from the apparatus, and the processor is further configured to generate a report request message comprising a value in the TTL field that determines at which device along the path of the RTP packet flow a monitor report is generated.

25. An apparatus comprising:
a network interface unit that is configured to receive one or more real-time transport protocol (RTP) packet flows;
a processor configured to be connected to the network interface unit, wherein the processor is configured to:
receive a monitor request message that requests monitoring of the RTP packet flow, wherein the monitor request message comprises an identifier that indicates the RTP packet flow to be monitored and an indicator that identifies recipient devices along the path of the RTP packet flow to perform monitoring of the RTP packet flow;
gather information about the RTP packet flow to monitor at least one parameter associated with the RTP packet flow in response to the monitor request message; and
send a response to the monitoring request message, wherein the response to the monitor request message contains the gathered information for use by a source device of the monitor request message to determine a particular one of the network locations along the path of the RTP packet flow that corresponds to a network fault causing degraded performance of the RTP packet flow.

26. The apparatus of claim 25, wherein the processor is further configured to generate a monitor report based on said monitoring and transmit the monitor report to a device that transmitted the monitor request message.

27. The apparatus of claim 26, wherein the processor is configured to monitor based on at least one attribute identified in the monitor request message, and to monitor RTP packet sequence numbers in the RTP flow to determine one or more of: whether there are skipped sequence numbers, missing RTP packets, packet delay greater than a threshold, and packet variation greater than a threshold.

28. The apparatus of claim 25, wherein the processor is further configured to decrement a value in a time-to-live (TTL) field in the received monitor request message and to evaluate a resulting value in order to determine whether to initiate monitoring of the RTP packet flow.

29. The apparatus of claim 25, wherein the processor is configured to receive a report request message, to decrement a value in a time-to-live (TTL) field in the received report request message and to evaluate a resulting value in order to determine whether to generate and transmit a monitor report.

* * * * *